(12) United States Patent
Wilks et al.

(10) Patent No.: US 9,726,762 B2
(45) Date of Patent: Aug. 8, 2017

(54) TIME OF FLIGHT CAMERA SYSTEM

(71) Applicant: IFM ELECTRONIC GMBH, Essen (DE)

(72) Inventors: Ralph Wilks, Meckenbeuren (DE); Christian Prestele, Friedrichshafen (DE)

(73) Assignee: PMDTECHNOLOGIES AG (DE)

(*) Notice: Subject to any disclaimer, the term of this patent is extended or adjusted under 35 U.S.C. 154(b) by 301 days.

(21) Appl. No.: 14/397,496

(22) PCT Filed: Apr. 26, 2013

(86) PCT No.: PCT/EP2013/058735
§ 371 (c)(1),
(2) Date: Oct. 28, 2014

(87) PCT Pub. No.: WO2013/174613
PCT Pub. Date: Nov. 28, 2013

(65) Prior Publication Data
US 2015/0103330 A1    Apr. 16, 2015

(30) Foreign Application Priority Data
May 21, 2012 (DE) .................. 10 2012 208 418

(51) Int. Cl.
*G01C 3/08* (2006.01)
*G01S 17/88* (2006.01)
(Continued)

(52) U.S. Cl.
CPC ............ *G01S 17/88* (2013.01); *G01S 7/4915* (2013.01); *G01S 17/36* (2013.01); *G01S 17/89* (2013.01)

(58) Field of Classification Search
CPC .......... G01S 17/36; G01S 17/88; G01S 17/89; G01S 7/4915
(Continued)

(56) References Cited

U.S. PATENT DOCUMENTS 6,587,186 B2    7/2003 Bamji et al.
7,274,815 B1 *  9/2007 Smithpeter .......... G06K 9/2036
                                                382/154
(Continued)

FOREIGN PATENT DOCUMENTS

DE         19704496 A1    3/1998
DE      102007012624 B3    6/2008

OTHER PUBLICATIONS

International Search Report; PCT/EP2013/058735; International Filing Date: Apr. 26, 2013; IFM Electronic GMBH; 2 pgs.

*Primary Examiner* — Mark Hellner
(74) *Attorney, Agent, or Firm* — Schmeiser, Olsen & Watts, LLP

(57) ABSTRACT

A light transit time camera system and method for operating such a system which can be operated with at least three modulation frequencies, having the steps a) determining a phase shift ($\phi_i$) of an emitted signal (Sp1) and a received signal (Sp2) for a modulation frequency ($f_1$, $f_2$, $f_3$) in a phase-measuring cycle ($PM_1$, $PM_2$, . . . ), b) carrying out a plurality of phase-measuring cycles ($PM_1$, $PM_2$, . . . ), c) determining a distance value ($d_{n,n+1}$) on the basis of the phase shifts ($\phi_n$, $\phi_{n+1}$) determined in two successive phase-measuring cycles ($PM_n$, $PM_{n+1}$), in a distance-measuring cycle ($M_1$, $M_2$, . . . ), d) carrying out a plurality of distance-measuring cycles ($M_1$, $M_2$, . . . ), e) determining a distance deviation ($\Delta d$) between the distance values of successive distance-measuring cycles, f) outputting of a distance value ($d_{n,n+1}$) as a valid distance value if the
(Continued)

distance deviation (Δd) is within a tolerance limit ($Δd_{tol}$) is provided.

5 Claims, 8 Drawing Sheets

(51) Int. Cl.
  *G01S 17/36* (2006.01)
  *G01S 17/89* (2006.01)
  *G01S 7/491* (2006.01)
(58) Field of Classification Search
  USPC .......................................... 358/5.01; 356/5.01
  See application file for complete search history.

(56) References Cited

U.S. PATENT DOCUMENTS

| | | |
|---|---|---|
| 2007/0102811 A1 | 5/2007 | Swaminathan et al. |
| 2009/0079959 A1 | 3/2009 | Masuda |
| 2013/0120565 A1 | 5/2013 | Wilks et al. |

\* cited by examiner

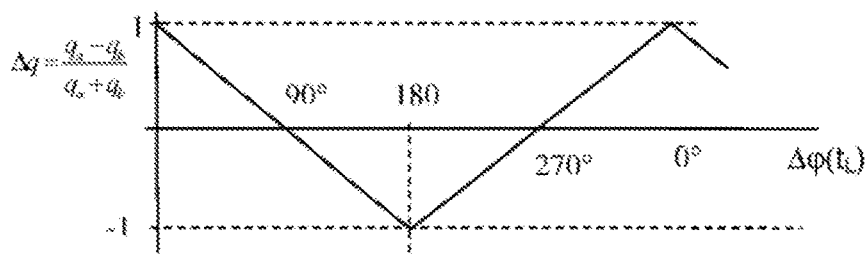
Fig. 3a
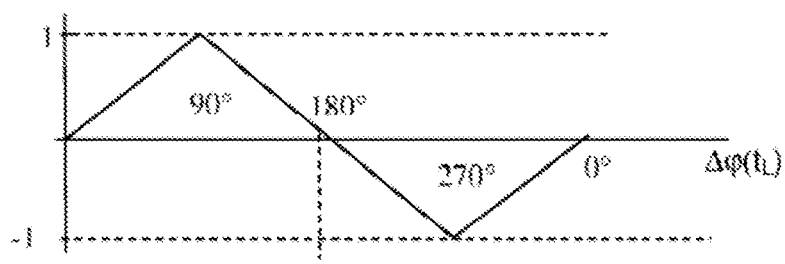
Fig. 3b
Fig. 3
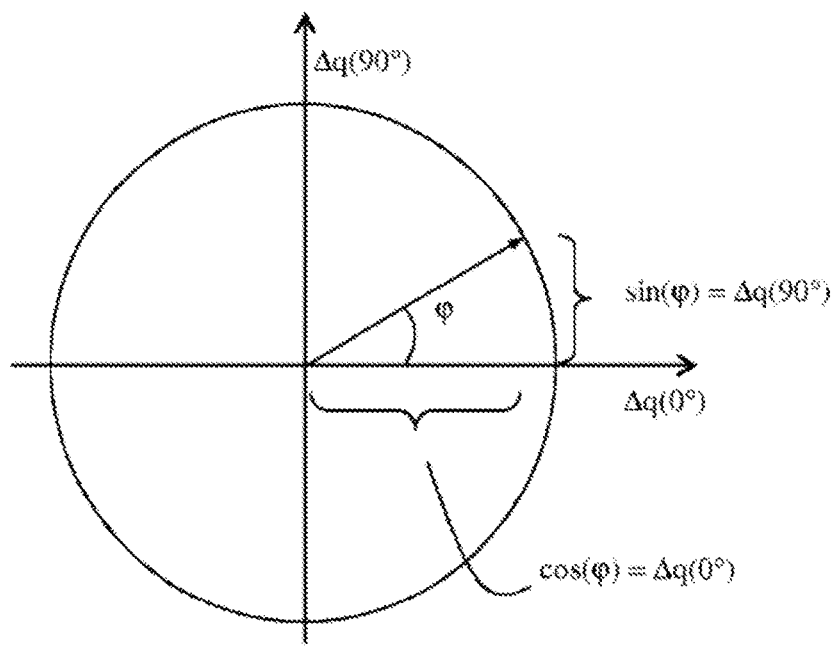
Fig. 4

TIME OF FLIGHT CAMERA SYSTEM

CROSS-REFERENCE TO RELATED APPLICATION

This application claims priority to PCT Application No. PCT/EP2013/058735, having a filing date of Apr. 26, 2013, based on DE 10 2012 208 418.5 filed May 21, 2012, the entire contents of which are hereby incorporated by reference.

FIELD OF TECHNOLOGY

The following relates to a time of flight (TOF) camera system and a method for operating such a system as described in the independent claims.

BACKGROUND

TOF camera systems should comprise not only systems that determine distances directly from the time of flight, but in particular also all TOF or 3D-TOF camera systems that extract runtime information from the phase shift of emitted and received radiation. PMD cameras including photonic mixer devices (PMD) are in particular suited as TOF or 3D-TOF cameras, such as are described in, among others, the applications EP 1 777 747, U.S. Pat. No. 6,587,186, and also DE 197 04 496, and which are, for example available from the firm "ifm electronic GmbH" or "PMD-Technologies GmbH" as Frame-Grabber O3D or as CamCube. The PMD camera allows in particular a flexible arrangement of the light source and of the detector, which can be disposed in a housing or also separately. Of course, cameras or devices having at least one receiving pixel should also be included under the term camera or camera system, such as for example the O1D distance measuring device of the applicant.

For determining a distance or a corresponding phase shift of the reflected light, as described in detail in DE 197 04 496, the reflected light is mixed with the modulating signal in the PMD sensor. This mixing delivers an in-phase signal (0°) and a signal shifted by 180°, from which a distance can be determined in a known manner. In order to improve the quality of the distance measurement it can be provided that the transmit modulation is shifted in a targeted manner, for example by 90°, 180°, or 270°, and preferably a phase angle of the reflected determined in relation to the transmitted signal using an IQ (inphase, quadrature) demodulation. This procedure is particularly useful for the extraction of redundant information in order to, for example, compensate for various parasitic effects such as fixed pattern noise (FPN), background light, or asymmetries of the sensor.

SUMMARY

An aspect relates to improving the distance measuring of a TOF camera system.

This aspect is achieved in an advantageous manner by the inventive method and the inventive TOF camera system as described in the independent claims.

A method for operating a TOF camera system is advantageously provided wherein the TOF camera system is operable with at least three modulation frequencies, having the steps:
a) determination of a phase shift of an emitted and received signal for a modulation frequency in a phase measurement cycle,
b) implementation of a plurality of phase measurement cycles,
c) determination of a distance value based on the phase shifts determined in two successive phase measurement cycles in a distance measurement cycle,
d) implementation of a plurality of distance measurement cycles
e) determination of a distance deviation between distance values of successive distance measurement cycles,
f) output of a distance value as a valid distance value if the distance deviation falls within a tolerance limit.

This procedure has the advantage that due to the use of a plurality of modulation frequencies the uniqueness range of the distance measurement increases, and the determination of a unique distance value can also be improved. In addition, interference of a plurality of TOF camera systems with each other due to the constant change of the modulation frequencies is reduced.

Furthermore, it is advantageous that despite an evaluation of a plurality of phases by means of the cyclic measurement, the effective frame rate is not reduced.

The tolerated deviation limits are typically limited downward by signal noise, proper motion, and object movements, whereby advantageously the deviation limit is set such that it is primarily distance mismatches that are recognized.

Just as advantageously, a TOF camera system is provided that includes a modulator that is connected to a means of illumination and a receiver of the TOF camera system, wherein a modulation control device is connected to the modulator and is designed such that the modulator is operable with at least three modulation frequencies, and the one evaluation unit is associated with the receiver and designed such that a distance value is only output as valid if a distance deviation of successive determined distance values falls within a tolerance limit.

BRIEF DESCRIPTION

Some of the embodiments will be described in detail, with reference to the following figures, wherein like designations denote like members, wherein:

FIG. 1 schematically shows the basic principle of the photonic mixing detection;

FIG. 3 shows two temporal profiles of the charge integration with different phase positions;

FIG. 4 shows the relation of the integration in an IQ diagram;

Figure 9:
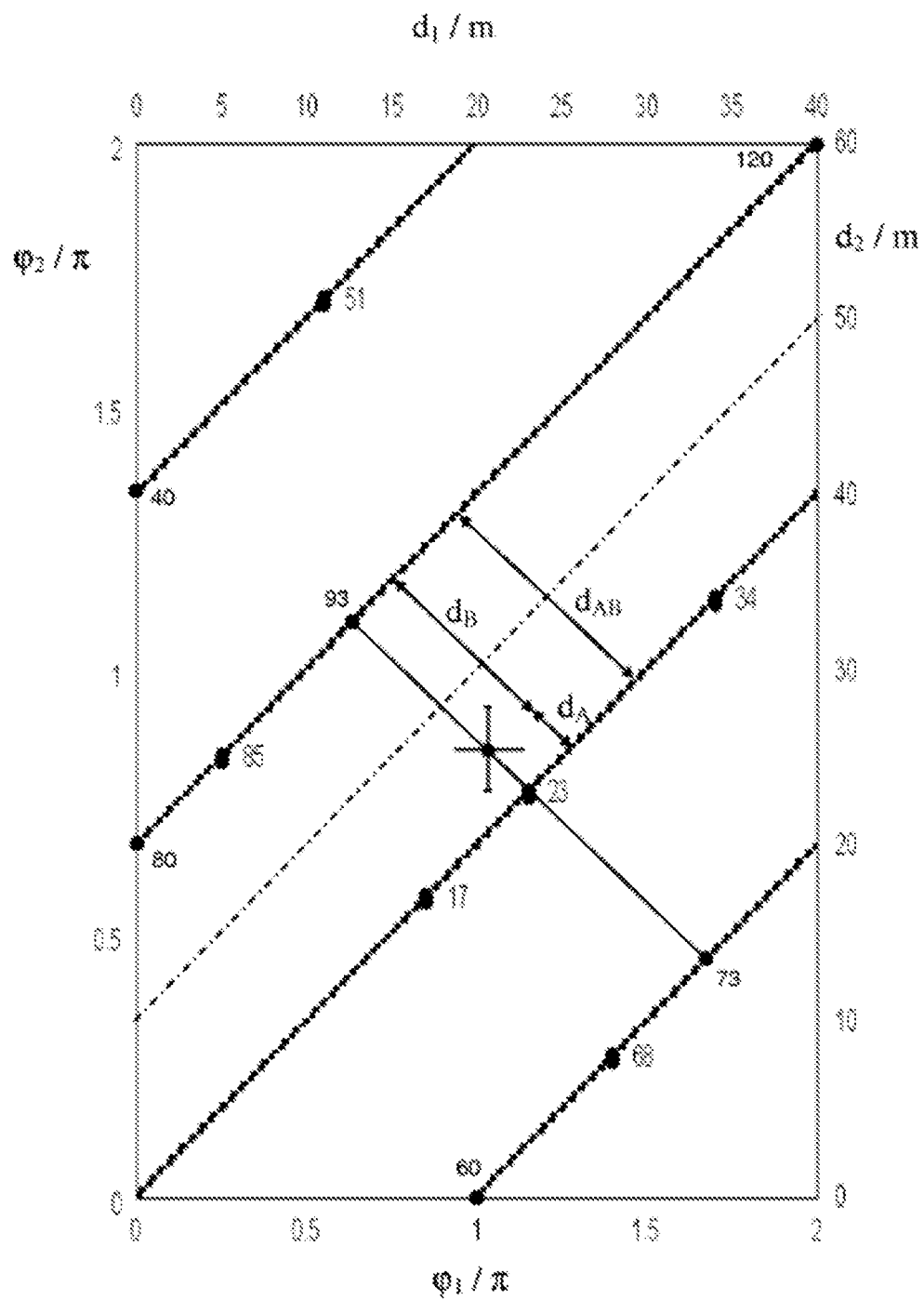
Figure 10:
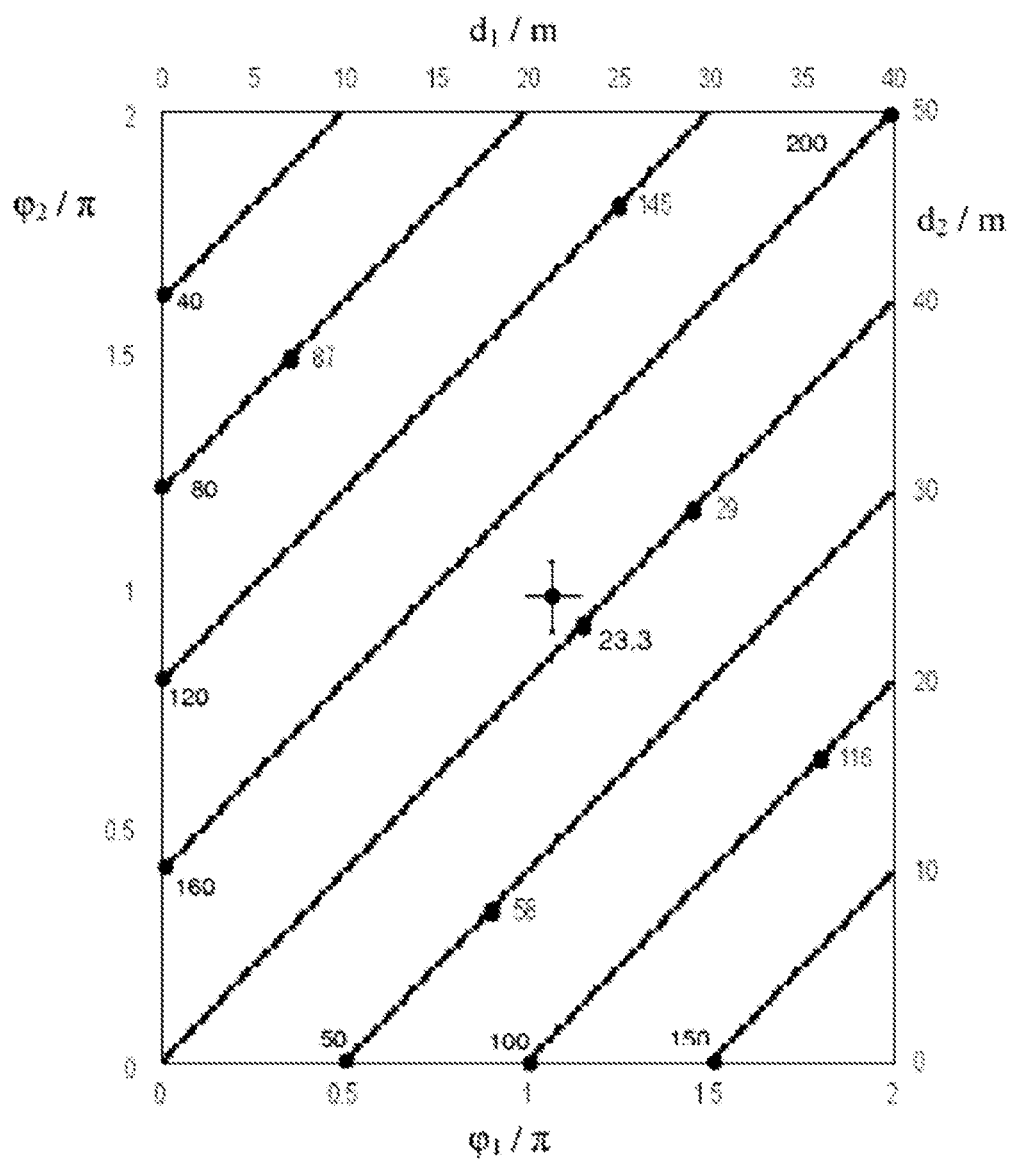
Figure 11:
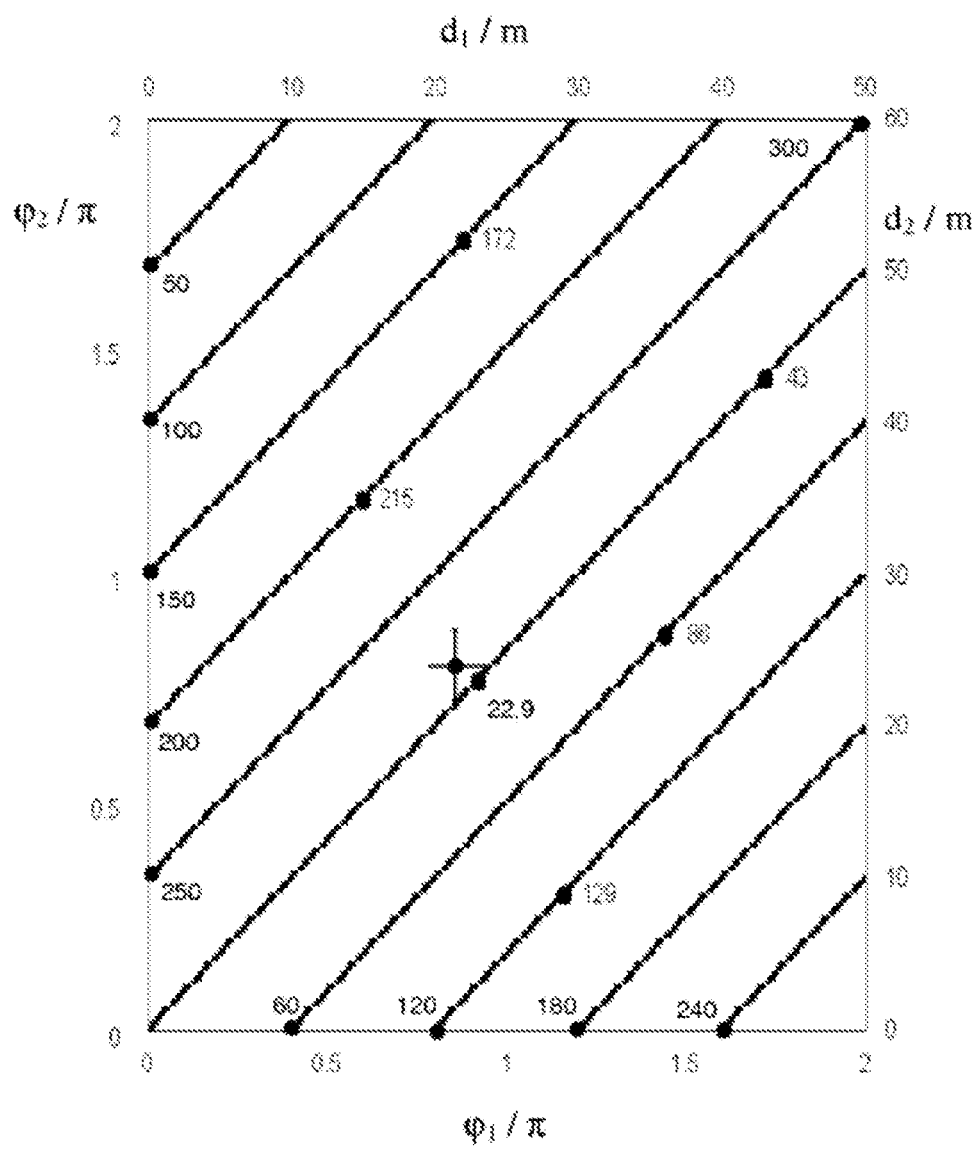
Figure 12:
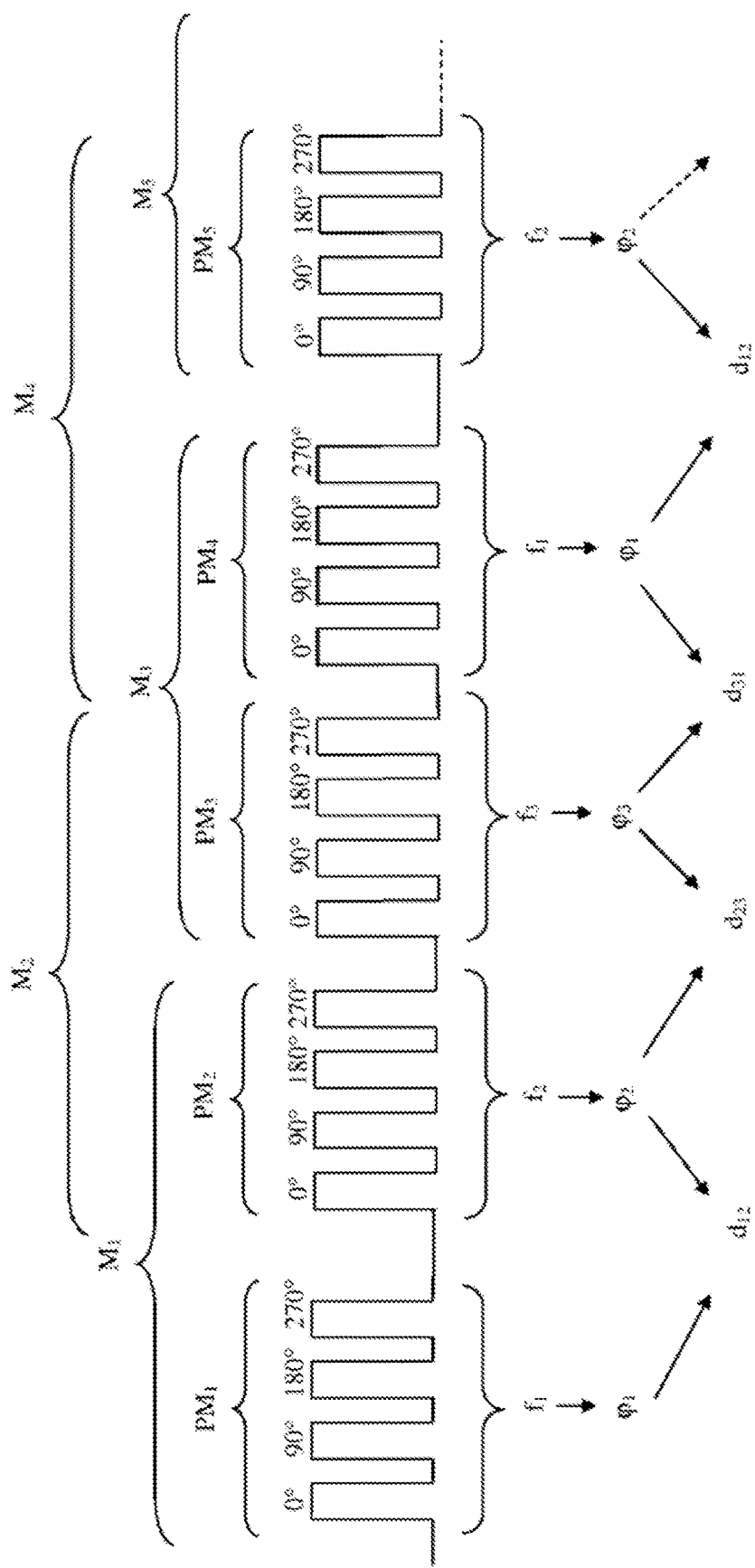

FIGS. 9 to 11 schematically show a distance determination for different wavelengths; and FIG. 12 shows a temporal sequence of the distance measurements.

DETAILED DESCRIPTION

Figure 1:
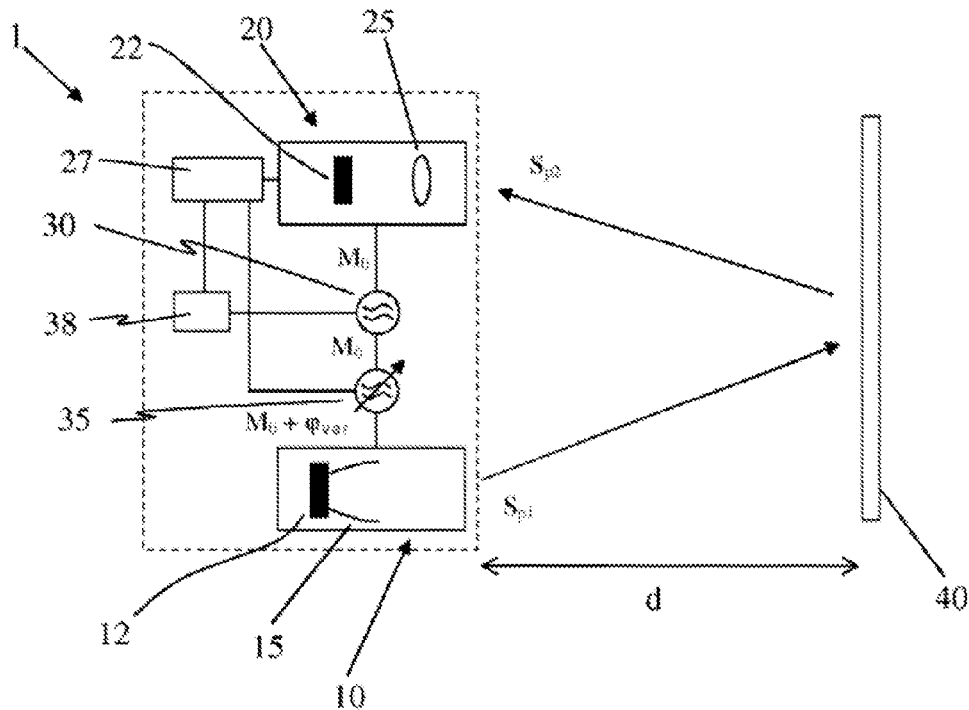

FIG. 1 shows a measurement position for an optical distance measurement using a TOF camera, such as is known, for example, from DE 197 04 496.

The TOF camera system 1 comprises a transmitting unit or a lighting module 10 including a lighting means 12 and associated beam-shaping optics 15 as well as a receiving unit or TOF camera 20 including receiving optics 25 and a TOF photo sensor 22.

The TOF photo sensor 22 includes at least one transit time pixel, preferably also a pixel array, and is formed in particular as a PMD sensor. For improving the imaging properties, the receiving optics 25 are typically comprised of a plurality of optical elements. The beam-shaping optics 15 of the transmitting unit 10 can, for example, be formed as reflector or lens optics. In a very simple design, receiving- and transmitting-side optical elements can also optionally be omitted.

The measurement principle of this arrangement is substantially based on the fact that starting from the phase shift of the emitted and received light, the transit time, and thus the distance traveled by the received light, can be determined. For this purpose, the light source 12 and the TOF photo sensor 22 are together subjected via a modulator 30 to a certain modulation signal $M_0$ having a base phase length $\phi_0$. In the example depicted, a phase shifter 35 is further provided between the modulator 30 and the light source 12, using which phase shifter 35 the base phase $\phi_0$ of the modulation signal $M_0$ of the light source 12 can be shifted by defined phase lengths $\phi_{var}$. For typical phase measurements, phase lengths of $\phi_{var}=0°$, 90°, 180°, 270° are preferably used. According to the set modulation signal, the light source 12 transmits an intensity modulated signal $S_{p1}$ having the first phase length p1 or p1=$\phi_0$+$\phi_{var}$. In the case depicted, this signal $S_{p1}$ or the electromagnetic radiation is reflected by an object 40 and, due to the distance traveled, meets correspondingly phase-shifted $\Delta\phi(t_L)$ with a second phase length p2=$\phi_0$+$\phi_{var}$+$\Delta\phi(t_L)$ as received signal $S_{p2}$ on the TOF photo sensor 22. In the TOF photo sensor 22 the modulation signal $M_0$ is mixed with the received signal $S_{p2}$, wherein the phase shifting or the object distance d is determined from the resulting signal.

In order to improve the measuring accuracy and/or expand the uniqueness range, it is advantageous to carry out the time of flight measurements with different modulation frequencies. For this purpose the modulator 30 is connected to a modulation control device 38, which can preferably specify modulation frequencies within a prespecified frequency spectrum.

The modulator 30 could, for example, be formed as a frequency synthesizer that is controlled via the modulation control device 38 for the respective measurement task. An exchange between quartz oscillators having fixed frequencies is also conceivable.

Furthermore, the receiving unit 20 is connected to an evaluation unit 27. The evaluation unit 27 can optionally also be a component of the receiving unit 20, and in particular also part of the TOF photo sensor 22. The object of the evaluation unit 27 is to determine and/or evaluate phase shifts based on the received signal in relation to the modulation frequency. The mixing of the received light beams with the modulation frequency preferably occurs in the TOF photo sensor 22 or PMD sensor. Furthermore, the modulation control unit 38 can also be a component of the evaluation unit 27. In particular, it can also be provided that the evaluation unit 27 fully or partially assumes the function of the modulation control unit 38.

Infrared light-emitting diodes are preferably suited as an illumination source or light source 12. Of course, other radiation sources in other frequency ranges are conceivable; in particular, light sources in the visible frequency range might also be considered.

Figure 2:
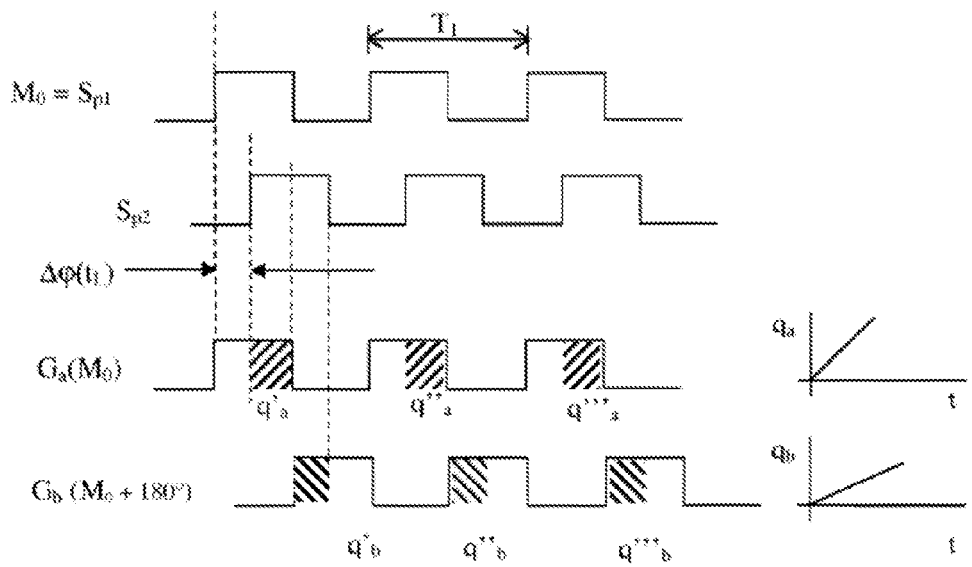
FIG. 2 shows a modulated integration of the generated charge carrier.

The basic principle of phase measurement is depicted schematically in FIG. 2. The upper curve shows the temporal profile of the modulation signal $M_0$ using which the illumination 12 and the TOF photo sensor 22 are controlled. The light reflected from the object 40 strikes the TOF photo sensor 22 as a received signal $S_{p2}$ phase shifted $\Delta\phi(t_L)$ according to its time of flight $t_L$. The TOF photo sensor 22 collects the photonically generated charges q over a plurality of modulation periods in the phase angle of the modulation signal $M_0$ in a first accumulation gate Ga and in a phase angle shifted by 180° $M_0$+180° in a second accumulation gate Gb. From the ratio of the charges qa, qb collected in the first and second gate Ga, Gb, the phase shift $\Delta\phi(t_L)$ and thus the distance d of the object can be determined.

FIGS. 3a and 3b show profiles of the charge difference $\Delta q=q_a-q_b/(q_a+q_b)$ depending on the phase shift $\Delta\phi(t_L)$ of the received light signal $S_{p2}$ with different phase angles. FIG. 3a shows a profile for an unshifted modulation phase $M_0$ having a phase angle $\phi_{var}=0°$.

When there is impact by the signal $S_{p2}$ without phase shift, i.e. $\Delta\phi(t_L)=0°$, for example, if the transmitted signal $S_{p1}$ is guided directly onto the sensor, the phases of the modulation $M_0$ and those from the received signal $S_{p2}$ are identical, so that all generated charge carriers are captured phase-synchronously at the first gate Ga and thus a maximum difference signal having $\Delta q=1$ is present.

With increasing phase shift, the charge at the first accumulation gate Ga decreases and increases at the second accumulation gate Gb. With a phase shift of $\Delta\phi(t_L)=90°$, the charge carriers qa, qb are equally distributed at the two gates Ga, Gb and the difference is thus 0, and after a 180° phase shift, "−1." With further increasing phase shift, the charge at the first gate Ga increases again, so that as a result the charge difference increases once more, again reaching a maximum at 360° or 0°.

Mathematically there is a correlation function here of the received signal $S_{p2}$ to the modulating signal $M_0$.

$$q(\tau) \int_0^T S_{p2}(t-\tau) M_0(t) dt$$

With a modulation using a square signal, as already shown, a delta function results as correlation function. With a modulation using, for example, a sinusoidal signal, the result would be a cosine function.

As FIG. 3 shows, a measurement of the phase with a phase angle is only unique up to a phase shift $\Delta\phi(t_L) \leq 180°$.

For maximum detection of the phase shift, the IQ (inphase quadrature) method, for example, is known, wherein two measurements are carried out having phase angles shifted by 90°, i.e. for example with the phase angle $\phi_{var}=0°$ and $\phi_{var}=90°$ The result of a measurement with the phase angle $\phi_{var}=90°$ is depicted in FIG. 3b. The result of a measurement with the phase angle $\phi_{var}=90°$ is depicted in FIG. 3b. The relationship between these two curves can be depicted in a known manner, for example for sinusoidal curve profiles in an IQ diagram according to FIG. 4. In a first approximation, this representation is also readily applicable to the depicted delta functions.

The phase angle can then be determined in a known manner via an arctan function:

$$\varphi = \arctan\frac{\Delta q(90°)}{\Delta q(0°)}$$

In order, for example, to compensate for asymmetries of the sensors, additional phase measurements shifted by 180° can be carried out, so that in the result, the phase angle can be determined as follows:

$$\varphi = \arctan\frac{\Delta q(90°) - \Delta q(270°)}{\Delta q(0°) - \Delta q(180°)}$$

From the propagation-time dependent phase shift $\Delta\phi(t_L)$ depicted in FIG. 2, a distance can be determined in a known manner for object distances d that are smaller than half of the wavelength $\lambda$ of the modulation frequency $d \leq \lambda/2$.

$$d = \Delta\varphi(t_L)\frac{\lambda}{2\pi} \cdot \frac{1}{2}$$

For distances $d > \lambda/2$, as a rule, there is no possibility to measure the phase shift absolutely, so the determined phase shift can no longer be uniquely associated with a distance value.

Figure 5:
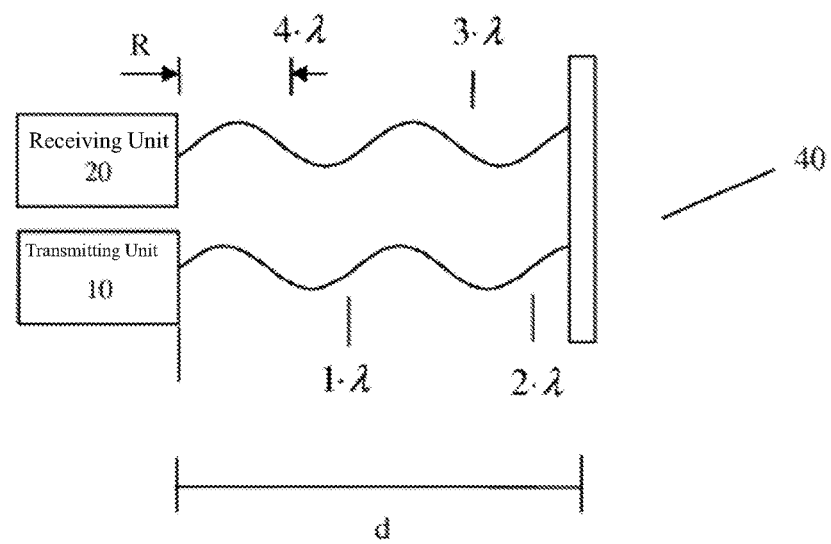
FIG. 5 shows a distance measurement with a wavelength.

FIG. 5 shows an example wherein the object 40 has a distance d from the transmitter 10 of $d = 2\lambda + \frac{R}{2}$, wherein of course the distance traveled up to the receiver 20 is twice as large, namely $D=2d=4\lambda+R$.

Figure 6:
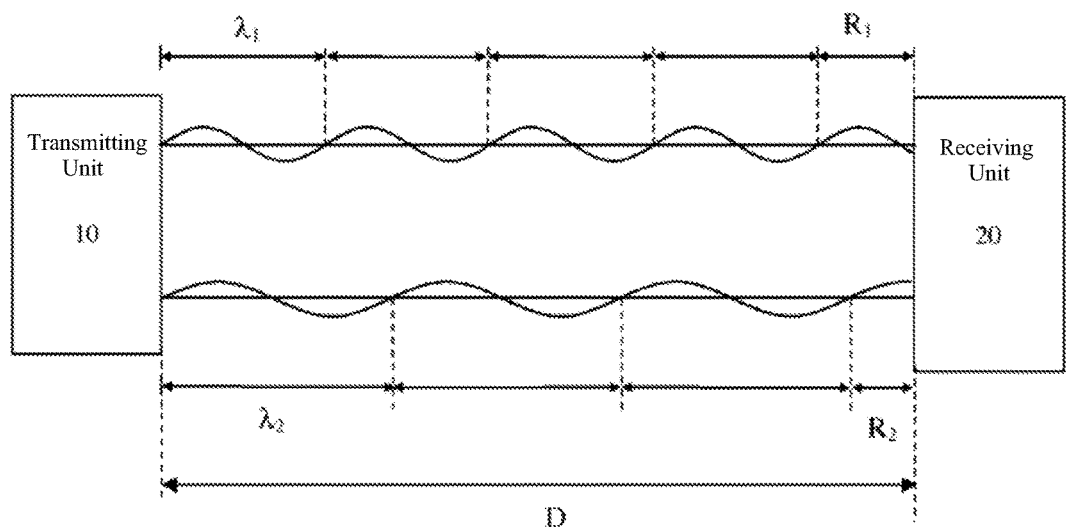
FIG. 6 shows a distance measurement with two different wavelengths.

To increase the uniqueness range it is provided, as schematically depicted in FIG. 6, that an object distance d is determined using at least two modulation frequencies or modulation wavelengths. For the sake of simplicity the entire distance D between transmitter 10 and receiver 20 is depicted in FIG. 6. Within the uniqueness range of the two wavelengths $\lambda_1$, $\lambda_2$, which typically extends through the smallest common multiple of the wavelengths $\lambda_1$, $\lambda_2$, the following distance equation applies:

$$D = 2d = n_1\lambda_1 + R_1 = n_2\lambda_2 + R_2$$

with $$Ri = D \cdot (\text{mod } \lambda_i) = \varphi_i(f_i, D)\frac{\lambda_i}{2\pi}$$

Wherein the following applies for the relative phase shift $\phi_i(f_i,D)$ dependent on the modulation frequency and the object distance:

$$\varphi_i \equiv \frac{D \cdot f_i}{c} \cdot 2\pi (\text{mod } 2\pi) = \frac{D}{\lambda_i} \cdot 2\pi (\text{mod } 2\pi)$$

The relative phase shift $\phi_i(f_i,D)$ is thus a measure of the residual $R_i$ remaining in the distance measurement. For the distance measurement, a solution for the distance comparison represented above can now be found using two phase shifts $\phi_{1/2}(f_{1/2},D)$ recorded for different modulation frequencies $f_1$, $f_2$.

Figure 7:
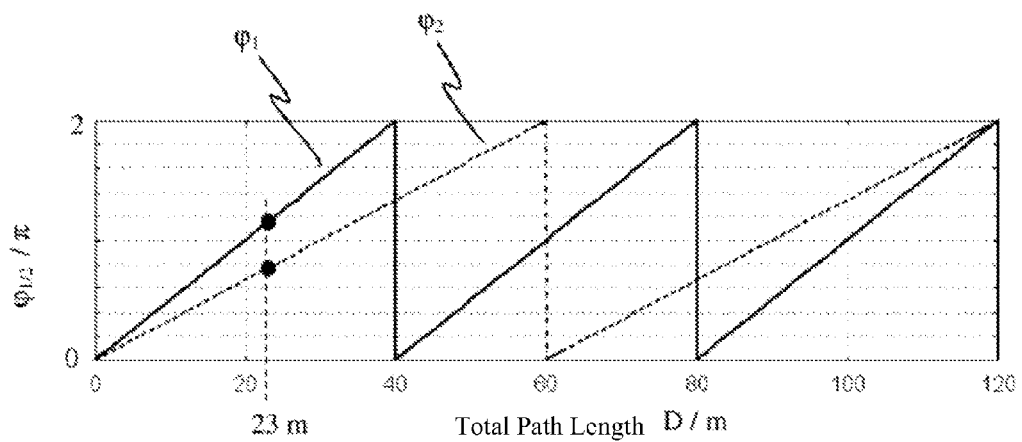
FIG. 7 shows a profile of the phase shifts with the distance.

One possible solution path is depicted schematically in FIG. 7. FIG. 7 shows two relative phase shifts $\phi_{1/2}(f_{1/2},D)$ that depend on double the object distance 2d=the total path length for two different frequencies $f_1$, $f_2$. The phase shift $\phi_1$ for $f_1$=7.5 MHz, corresponding to a wavelength $\lambda_1$=40 m, is depicted using solid lines, and the phase shift for $f_2$=5 MHz, corresponding to a wavelength $\lambda_2$=60 m, is depicted using a dashed line. The uniqueness range $EB_{12}$ for the two frequencies $f_1$, $f_2$ results in a known manner from the least common multiple of the two wavelengths $\lambda_1$, $\lambda_2$, i.e., here 120 m. For each distance value or each total path length DC within the common unambiguous range $EB_{12}$ there is exactly one phase difference pair $(\phi_1, \phi_2)$. For the exemplary distance value D of 23 m, i.e. an object distance d of 11.5 m, a phase difference pair results of approximately (1.2|0.8).

In one possible application case it could be provided, for example, that an appropriate number of phase differential pairs are recorded together with their associated distance value D or object distance d in a table of values. With a distance measurement, it can then be determined, for example, which tabulated phase difference pair having a correspondingly associated distance value is closest to the determined phase difference pair. Alternatively, the object distance can also be calculated each time.

Figure 8:
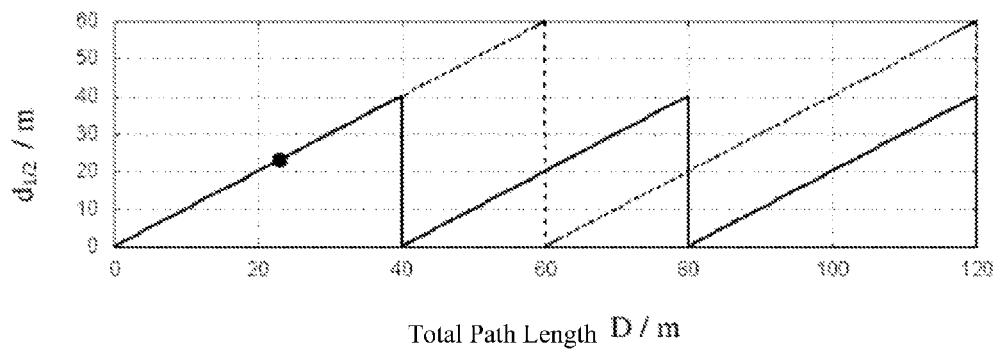
FIG. 8 shows a profile of the distance values for different wavelengths.

FIG. 8 corresponds to the depiction according to FIG. 7, with the difference that the length of the respective remainder is plotted on the y-axis where:

$$R_i = D \cdot (\text{mod } \lambda_i) = \varphi_i(f_i, D)\frac{\lambda_i}{2\pi}$$

In the example depicted, the two residuals are of the same length up to a total wavelength D, which corresponds to the smallest wavelength, i.e., here 40 m.

However, for a total distance D of, for example, 70 m, the residuals are of different sizes.

The relationship between phase and distance depicted in FIGS. 7 and 8 can be advantageously depicted in a so-called modulus diagram according to FIGS. 9 to 11. The phase values $\phi_1$ and $\phi_2$ for a first and second modulation frequency are depicted on the x- and y-axis, and the distance values or residual values $d_1$, $d_2$ corresponding to the phase values are depicted on the secondary x- and y-axis. As already explained, there exists only a single phase value pair for a distance value within the uniqueness range.

FIG. 9 shows a modulus diagram for the frequencies $f_1$=7.5 MHz corresponding to a wavelength $\lambda_1$=40 m, and $f_2$=5 MHz corresponding to a wavelength $\lambda_2$=60 m as previously depicted in FIGS. 7 and 8. The curve starts with the phase differential pair (0|0) for D=0. If the total wavelength of the light reflected from the object reaches the wavelength $\lambda_1$=40 m, the first modulation frequency thus also reaches the phase value of its maximum value, namely $2\pi$ with the phase value pair (2|1.33). With greater distance the curve always jumps to the points at which one of the two phase values passes through a $2\pi$-value, until a uniqueness range EB of 120 m is reached. A distance can be determined, for example, by associating a determined phase value pair with a distance point of the distance curve. In the case depicted in FIG. 9, a measured phase value pair is exemplarily indicated with (1.05|0.85). This phase value pair does not fall on the distance curve and is now to be associated with a distance point on one of the two curve sections. The distance $d_{AB}$ between the curve sections is known. For the association it is therefore sufficient to determine the distance $d_A$, $d_B$ to one of the two curve sections. The object distance is thus then determined from the closest distance point. In the case depicted, the phase value pair can have a distance value D of 23 m, i.e. an actual object distance d of 11.5 m.

However, if a detected phase value pair falls, for example, in the center of the adjacent distance line or curve sections, the distance association is unclear. In such a case, the phase value pair could be associated with a distance of 93 m instead of the actual distance of 23 m.

However, mismatches arise not only due to unclear phase value pairs, but also due to overreach of objects outside the uniqueness range. In the depicted case, the uniqueness range EB extends to 120 m total distance D, i.e. to a maximum object distance d of 60 m. A TOF camera system is typically designed such that objects outside the uniqueness range provide only a low-level signal and are not taken into consideration in the evaluation. However, objects having a higher reflectivity can generate a sufficiently high signal strength at the sensor and are recognized as objects.

If, for example, such an object is at an actual distance of d=71.5, i.e. a total travel distance of 143 m, due to the uniqueness range bounded at 120 m, such an object would be captured with a total distance D of 23 m. With an overreach with the total distance of 213 m, a distance value D of 93 m results. In order to detect such mismatches, it is inventively provided that the distance measurement is repeated with additional different modulation frequencies and correspondingly different uniqueness ranges, and that distance values are only allowed when preferably all or a predetermined number of distance measurements within tolerated limits lead to the same result.

In FIG. 10 a modulus diagram for the frequency pairing $f_1$=7.5 MHz corresponding to a wavelength $\lambda_1$=40 m, and $f_2$=6 MHz corresponding to a wavelength $\lambda_2$=50 m is depicted. This frequency pairing extends over a uniqueness range EB up to 200 m. The phase value pair determined using this frequency pairing can be associated with a distance of 23.3 m. With an unclear phase value pair, the distance could jump to 178 m. For the mentioned overreach example of D=143 m and D=213 m, distance values D=143 m and D=13 m would result.

In FIG. 11 a modulus diagram for the frequency pairing $f_1$=6 MHz corresponding to a wavelength $\lambda_1$=50 m, and $f_2$=5 MHz corresponding to a wavelength $\lambda_2$=60 is depicted with a uniqueness range of 300 m. The phase value pair determined with this frequency pairing can be associated with a distance of 22.9 m. A mismatch due to an unclear phase value pair possibly leads to a distance value of 267.5 m. For the mentioned overreach examples of D=143 m and D=213 m, with unique association distance values D=143 m and D=213 m would result.

Some examples of mismatches and measurement noise are shown in the following table:

In the example depicted it can be seen that measurement fluctuations caused by signal noise are smaller by orders of magnitude than the mismatches generated due to overreaches or due to unclear measurement values. While fluctuations originating due to signal noise can be readily smoothed out by averaging, incorrectly assigned distance values must be recognized and, as necessary, discarded.

With regard to overreaches, it could, for example, be decided that a distance measurement value is only valid if substantially the same distance value is determined in two successive distance measurement cycles. According to such a provision, in accordance with the above table, a distance value of 143 m would be recognized as valid for an overreach of 143 m of the second and third distance measurement cycle. If at least three identical distance values are required, then, in the example depicted, all overreaches greater than 120 m are discarded.

FIG. 12 exemplarily shows a temporal sequence of an inventive distance measurement for different frequency pairings, wherein the relative phase shift $\phi_i(f_i,D)$ for each modulation frequency $f_i$ is carried out with four phase angles $\phi_{var}$=0°, 90°, 180°, 270°. Of course, distance measurements with fewer, and optionally also more phase angles are conceivable.

In a first phase measurement cycle $PM_1$ a first phase shift $\phi_1$ is determined for a first modulation frequency $f_1$, and for the subsequent phase measurement cycles $PM_{2/3}$ a second and third phase shift $\phi_2$, $\phi_3$ is determined for a second and third modulation frequency $f_2$, $f_3$. After the third phase measurement cycle $PM_3$ the phase measurements begin again with the first modulation frequency $f_1$ and so forth. With more than three modulation frequencies, other frequency sequences, in particular also random sequences, can be selected.

Each two successive phase measurement cycles $PM_{n,n+1}$ form a distance measurement cycle $M_n$ from the one phase value pair ($\phi_n$, $\phi_{n+1}$) and a distance value $d_{n,n+1}$ associated with this pair.

According to embodiments of the invention, it is provided here that a distance value d is only considered valid if the distance difference of successive distance measurement cycles falls within tolerated limits.

A possible inventive procedure is exemplarily illustrated in the following table:

| | Distance measurement cycle | | | | | | | | |
|---|---|---|---|---|---|---|---|---|---|
| | 1 | 2 | 3 | 4 | 5 | 6 | 7 | 8 | 9 |
| EB | 120 | 200 | 300 | 120 | 200 | 300 | 120 | 200 | 300 |
| Distance | $d_{12}$ | $d_{23}$ | $d_{31}$ | $d_{12}$ | $d_{23}$ | $d_{31}$ | $d_{12}$ | $d_{23}$ | $d_{31}$ |
| | | | Unclear phase value pairs | | | | | | |
| D = 23 m | 23 | 178 | 267.5 | 93 | 23 | 23 | 93 | 23 | 267.5 |
| | | | | Overreaches | | | | | |
| D = 143 m | 23 | 143 | 143 | 23 | 143 | 143 | 23 | 143 | 143 |
| D = 213 m | 93 | 13 | 213 | 93 | 13 | 213 | 93 | 13 | 213 |
| D = 340 m | 100 | 140 | 40 | 100 | 140 | 40 | 100 | 140 | 40 |
| | | | | Signal noise | | | | | |
| D = 23 m | 23.2 | 22.5 | 23.0 | 23.4 | 23.4 | 22.8 | 22.7 | 23.1 | 22.9 |

| | Distance measurement cycle | | | | | | | | |
|---|---|---|---|---|---|---|---|---|---|
| | 1 | 2 | 3 | 4 | 5 | 6 | 7 | 8 | 9 |
| EB | 120 | 200 | 300 | 120 | 200 | 300 | 120 | 200 | 300 |
| Distance | $d_{12}$ | $d_{23}$ | $d_{31}$ | $d_{12}$ | $d_{23}$ | $d_{31}$ | $d_{12}$ | $d_{23}$ | $d_{31}$ |
| D = 23 m | 23.4 | 22.5 | 23.0 | 23.7 | 178 | 23.1 | 23.2 | 24 | 267 |
| Difference | 23.4 | 0.9 | 0.5 | 0.7 | 155.3 | 145.9 | 0.1 | 0.8 | 243 |
| Tolerance 50 m | — | < | < | < | > | > | < | < | > |
| Valid value | (−) | (+) | (+) | (+) | (−) | (−) | (+) | (+) | (−) |
| Output | | 22.5 | 23.0 | 23.7 | | | 23.2 | 24 | |

In order to detect mismatches, the tolerance limit is preferably set significantly higher than a typical signal noise and below a minimum possible distance jump due to mismatch. A typical signal noise can, for example, be assumed in the angular range of $\pi/100$ and thus in the distance range of EB/100. In the case according to FIG. 9, a lower threshold for the tolerance range of 1.2 m would thus result. As can be further inferred from FIG. 9, distance jumps for adjacent lines of 70 m and 50 m are possible; the minimum possible distance jump is thus measured at 50 m. The tolerance limit is then to be advantageously chosen between 1.2 m and 50 m. For example, a tolerance limit $\Delta d_{tol}$ of ±20 m would be suitable. In the example depicted, the starting point for the use of the tolerance limit is the distance difference with respect to the previous distance value. At the start of the measuring there is not yet any previous distance measurement present in the first distance measurement cycle, so the true distance value is not output. The evaluation is then possible starting from the second distance measurement.

The distance values determined in the second, third, and fourth measurement cycle fall within the tolerance limits, are thus valid, and are output. For certain evaluation methods it could also be optionally provided to recursively evaluate and output the most recent evaluation value if it falls within the tolerance, as is the case in the depicted first measurement cycle.

In the fifth measurement cycle, a mismatch occurred with a distance jump to 178 m, which exceeds the tolerance limit. This distance value is invalid and is not output. A valid distance value is not available until the seventh distance measurement cycle. Here too, it might be possible to recursively output the most recent sixth distance value falling within the tolerance as valid.

According to embodiments of the invention it is provided that the tolerance limits are principally set such that misallocations are reliably detected. Of course the tolerance limits can be fixed more narrowly depending on the accuracy requirement of the distance measurements.

With a moving camera and/or moving object, the movement speeds must also be considered.

If, for example, the camera is moved with a maximum speed of 10 m/s and a detection rate of 1/50 s is assumed for each phase measurement, then each distance point shifts by 0.2 m between two measurements. This means that with three successive measurements, a distance point will shift by 0.6 m due to the camera movement alone. For the determination of the tolerance limits it would thus be advantageous to consider a camera proper motion and optionally also an expected object movement and possible measurement error.

For example, in the present example, the tolerance limits, in particular the lower threshold for the tolerance limits, could for example be extended by 1.2 m.

The invention claimed is:

1. A method for operating a TOF camera system which is operable with at least three modulation frequencies, the method comprising:
   a) implementation of a plurality of phase measurement cycles with different modulation frequencies;
   b) determination of a phase shift of an emitted and received signal for different modulation frequencies in each phase measurement cycle of the plurality of phase measurement cycles;
   c) implementation of a plurality of distance measurement cycles;
   d) determination of a distance value based on the phase shifts determined according to step b) in two subsequent phase measurement cycles in each distance measurement cycle of the plurality of distance measurement cycles;
   e) determination of a distance deviation between distance values according to step d) of successive distance measurement cycles; and
   f) output of a distance value according to step d) as a valid distance value if the distance deviation according to step e) falls within a tolerance limit.

2. The method according to claim 1, wherein the value of the tolerance limit is greater than a signal noise of the distance value and smaller than a minimum possible distance jump.

3. A TOF camera system including a modulator which is connected to a lighting means for transmitting an intensity modulated signal and a receiver of the TOF camera system, wherein
   a modulation control unit is connected to the modulator, and is designed such that the modulator is operable with at least three modulation frequencies,
   and that successive distance measurements have different modulation frequency pairings,
   and the one evaluation unit is designed such that:
   a phase shift is determined for each modulation frequency,
   a distance is determined for each two successive phase shift measurements, and
   a distance value is only output as valid if a distance deviation of successive determined distance values falls within a tolerance limit.

4. The TOF camera system including a modulator which is connected to a lighting means for transmitting an intensity modulated signal and a receiver of the TOF camera system, wherein
   a modulation control unit is connected to the modulator, and is designed such that the modulator is operable with at least three modulation frequencies, and that successive distance measurements have different modulation frequency pairings, and the one evaluation unit is designed such that:

a phase shift is determined for each modulation frequency, a distance is determined for each two successive phase shift measurements, and a distance value is only output as valid if a distance deviation of successive determined distance values falls within a tolerance limit that is designed for carrying out a method according to claim 1.

5. The TOF camera system including a modulator which is connected to a lighting means for transmitting an intensity modulated signal and a receiver of the TOF camera system, wherein a modulation control unit is connected to the modulator, and is designed such that the modulator is operable with at least three modulation frequencies, and that successive distance measurements have different modulation frequency pairings, and the one evaluation unit is designed such that:

a phase shift is determined for each modulation frequency, a distance is determined for each two successive phase shift measurements, and a distance value is only output as valid if a distance deviation of successive determined distance values falls within a tolerance limit that is designed for carrying out a method according to claim 2.

* * * * *